United States Patent
Aoyama et al.

(10) Patent No.: US 7,262,728 B2
(45) Date of Patent: Aug. 28, 2007

(54) DATA TRANSFER APPARATUS FOR INDUSTRIAL MACHINERY

(75) Inventors: Kazunari Aoyama, Yamanashi (JP); Minoru Nakamura, Fujiyoshida (JP); Masahiro Miura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/291,907

(22) Filed: Dec. 2, 2005

(65) Prior Publication Data
US 2006/0119498 A1 Jun. 8, 2006

(30) Foreign Application Priority Data
Dec. 3, 2004 (JP) ............................ 2004-351523

(51) Int. Cl.
*H03M 1/12* (2006.01)
*B29C 39/00* (2006.01)

(52) U.S. Cl. ...................... 341/155; 700/197

(58) Field of Classification Search ............... 341/155, 341/118, 122; 702/190, 191; 264/541; 700/203, 700/187
See application file for complete search history.

(56) References Cited

U.S. PATENT DOCUMENTS

| | | | |
|---|---|---|---|
| 4,677,852 A * | 7/1987 | Pinyan et al. ................... | 73/628 |
| 5,809,451 A * | 9/1998 | Parsons et al. ............. | 702/190 |
| 6,467,469 B2 * | 10/2002 | Yang et al. ............. | 123/568.21 |
| 6,936,985 B2 * | 8/2005 | Pankey et al. ............... | 318/443 |

FOREIGN PATENT DOCUMENTS

JP 9-76318 3/1997

* cited by examiner

*Primary Examiner*—Peguy JeanPierre
(74) *Attorney, Agent, or Firm*—Staas & Halsey LLP

(57) ABSTRACT

A pressure measured by a load cell is converted into a digital signal by an A/D converter provided in an analog interface, and is processed by a digital filter provided in the analog interface. A sensor signal processed in the digital filter is transferred to a controller 10 for industrial machinery every transfer cycle via an optical fiber. A digital sampling cycle by the A/D converter is set to be shorter than the transfer cycle.

2 Claims, 1 Drawing Sheet

DATA TRANSFER APPARATUS FOR INDUSTRIAL MACHINERY

BACKGROUND OF THE INVENTION

1. Field of the Invention

The present invention relates to a transfer apparatus for transferring measurement data detected by a sensor in various industrial machineries.

2. Description of the Related Art

In various industrial machineries, various physical amounts are detected by a sensor attached to an industrial machinery, and detection signals thereof (analog signals) are transferred to a controller of the industrial machinery directly or via an amplifier. On the other hand, an A/D converter, which is provided inside the controller, converts the received detection signals into digital signals, and the controller utilizes the same for controlling.

For example, in an injection molding machine, a pressure applied to an injection screw for detecting a resin pressure inside a heating cylinder is detected by a sensor such as load cell, and a detection signal thereof (analog signal) is transferred to a controller for controlling the injection molding machine. On the other hand, an A/D converter, which is provided inside the controller, converts the received detection signal into a digital signal, and the controller utilizes the digital signal converted (pressure information) for injection control (see Japanese Patent Application Laid-Open No. 9-76318).

The analog signal measured by the sensor is digitally sampled in the A/D converter to be converted into a digital signal, and the digital signal converted is serially transferred to the controller. On the other hand, the digital signal received from the sensor is subjected to a filtering processing in a digital filter for noise removing, and the controller utilizes the same.

When the sensor output is transferred to the controller in the state of analog signal, there is a problem that noise occurring along with the transfer of analog signal is easily mixed in a sensor signal.

At the sensor side, the A/D converter digitally samples a sensor detection signal to convert it into a digital signal, and transfers the same to the controller. On the other hand, at the controller side, the transferred digital signal is subjected to a filtering processing for noise removing, and is then utilized. In this case, the sensor signal received by the controller is a signal every transfer cycle. Finally, a cycle at which the signal detected by the sensor is digitally sampled in the A/D converter is limited to the transfer cycle. It is useless that A/D conversion is performed at a sampling cycle shorter than the transfer cycle, and an accuracy of the sensor signal which can be grasped by the controller is determined by the transfer cycle.

Since the filtering processing is performed by the digital filter for noise removing at the controller side, the filtering processing is realized only after the serial transfer is performed a predetermined number of times or more. Thus, there is a problem that it takes much time after the sensor detects the physical amount until the controller utilizes the sensor output signal, causing a delay.

SUMMARY OF THE INVENTION

In a data transfer apparatus for industrial machinery according to the present invention, a signal from a sensor attached to an industrial machinery is transferred to a controller for controlling the industrial machinery. The industrial machinery has an analog interface including an A/D converter for converting an analog signal from the sensor attached to the industrial machinery into a digital signal and a digital filter for removing noise in the digital signal. The digital signal in which noise is removed by the digital filter is transferred to the controller via serial communication.

In the data transfer apparatus for industrial machinery according to the present invention, a sampling cycle of the analog signal by the A/D converter can be made shorter than a transfer cycle via the serial communication. Further, the digital filter can be configured of a logic circuit with hardware.

According to the data transfer apparatus of the present invention, a cycle is not limited to the transfer cycle at which a measurement signal is transmitted from the sensor to the controller and an analog signal detected by the sensor can be converted into a digital signal, thereby transferring the measurement digital signal with high accuracy. Further, since the digital filtering processing is performed based on the signal obtained every digital sampling cycle of the A/D conversion, a delay of the output of the digital filter becomes shorter so that the controller can obtain the sensor signal with high accuracy and less delay.

DETAILED DESCRIPTION OF THE PREFERRED EMBODIMENTS

Figure 1:
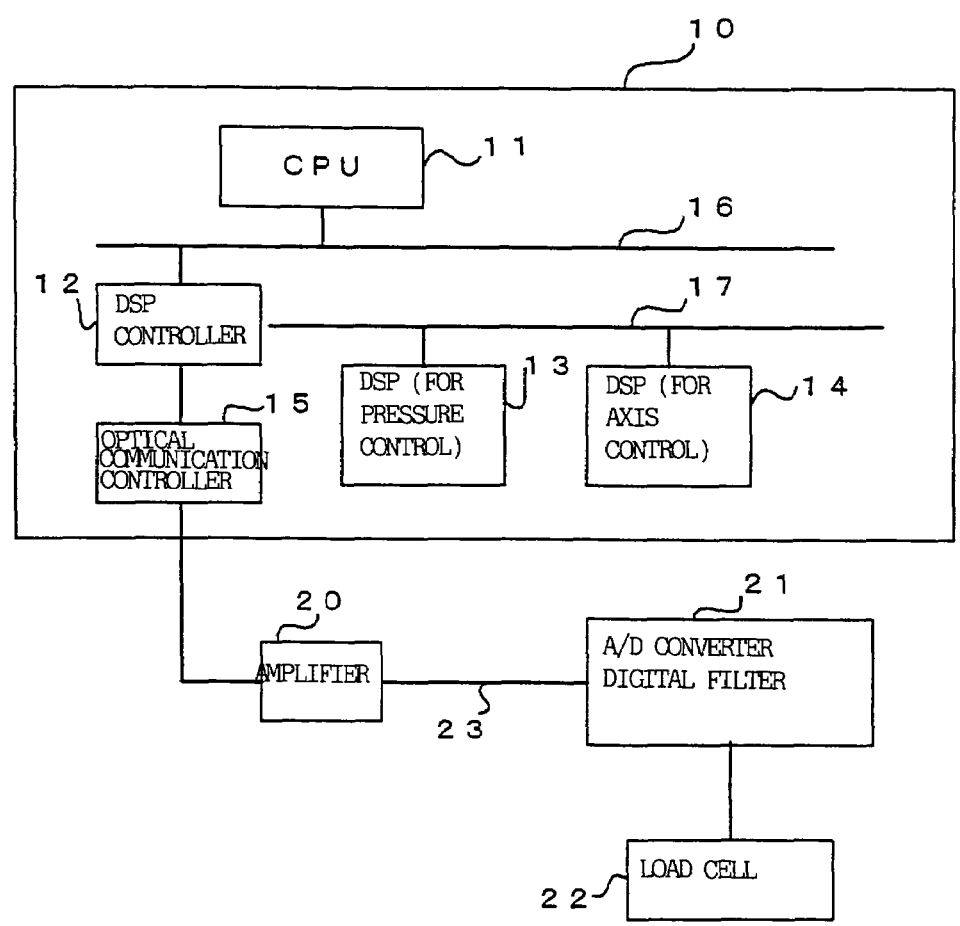
FIG. 1 is a block diagram of essential parts of one embodiment of a data transfer apparatus for industrial machinery according to the present invention.

FIG. 1 is a block diagram of essential parts of one embodiment of a data transfer apparatus for industrial machinery according to the present invention. FIG. 1 shows an example in which an injection molding machine is used as an industrial machinery.

In FIG. 1, reference numeral 10 denotes a controller for controlling the injection molding machine, which is configured of a computerized numerical controller (CNC). A CNC internal bus 16 provided in the controller 10 is connected with a processor (CPU) 11 for performing numerical control and a DSP (Digital Signal Processor) controller 12. The DSP controller 12 is connected with a pressure control DSP 13 and a axis control DSP 14 which controls a servo motor for driving each movable portion such as injection axis, mold clamping axis and eject axis in the injection molding machine via a DSP bus 17. Further, an optical communication controller 15 is connected to the DSP controller 12.

The controller 10 comprises a memory such as ROM and RAM, input/output circuit, a display, a keyboard for inputting/outputting data, and the like, but these elements do not have a direct relation with the present invention in FIG. 1, and are not illustrated.

As a sensor provided in the injection molding machine, FIG. 1 shows an example of a load cell 22 for detecting a resin pressure. An output of this load cell 22 is input into an analog interface 21. An output of the analog interface 21 is transferred to the controller 10 through optical serial communication via an optical fiber 23, and is input into an optical communication controller 15 inside the controller 10 via an amplifier 20.

The analog interface 21 comprises an A/D converter and a digital filter composed of a logic circuit with hardware.

The load cell 22 detects a resin pressure applied to an injection screw and outputs a detection signal to the analog interface 21. The analog interface 21 converts the detected analog signal from the load cell 22 into a digital signal by the A/D converter, and performs digital filtering processing therefor by the digital filter for noise removing.

On the other hand, the optical communication controller 15 provided in the controller 10 reads out an output of the analog interface 21 (resin pressure detected by the load cell 22, which has been converted into a digital signal and has been subjected to the digital filtering processing) via the amplifier 20 every predetermined transfer cycle. The pressure control DSP 13 utilizes the read resin pressure for injection pressure control or the like.

A digital sampling cycle of a processing of converting an analog signal into a digital signal, which is performed by the A/D converter included in the analog interface 21, is set to be shorter than a serial communication cycle by the optical fiber 23. The digital signal converted at the digital sampling cycle is subjected to the filtering processing by the digital filter. Then, the digital signal after being subjected to the filtering processing is transferred to the controller 10 every transfer cycle. Therefore, the digital sampling cycle of the A/D converter is not limited by the transfer cycle. Since a signal is converted into a digital signal at the digital sampling cycle shorter than the transfer cycle and the signal is subjected to the digital filtering processing, a measurement signal from the sensor can be converted into a digital signal with high accuracy and an output of the digital filtering processing is performed with less delay so that a signal from the load cell 22, which the controller 10 obtains every predetermined transfer cycle, is a signal with high accuracy and less delay.

In the example in FIG. 1 described above, the injection molding machine is used as an industrial machinery and the load cell for detecting a resin pressure is used as a sensor, but the data transfer apparatus for industrial machinery according to the present invention can be utilized as a transfer apparatus for transferring a detection signal from a sensor for measuring various physical amounts such as pressure, force, speed, temperature and flow rate to a controller for industrial machinery in various industrial machineries other than the injection molding machine.

The invention claimed is:

1. A data transfer apparatus for an injection molding machine transferring a signal every predetermined transfer cycle, comprising:
   a sensor attached to the injection molding machine;
   a controller controlling the injection molding machine, the signal being transferred from the sensor to the controller,
   wherein the injection molding machine has an analog interface including an A/D converter converting an analog signal from the sensor into a digital signal and a digital filter removing noise in the digital signal, and the digital signal in which noise is removed by the digital filter is transferred to the controller via serial communication; and
   wherein a sampling cycle of the analog signal by the A/D converter is made shorter than a transfer cycle via the serial communication.

2. A data transfer apparatus for the injection molding machine according to claim 1, wherein the digital filter is composed of a logic circuit with hardware.

* * * * *